US010886688B1

(12) United States Patent
Peters et al.

(10) Patent No.: US 10,886,688 B1
(45) Date of Patent: Jan. 5, 2021

(54) CALIBRATION TECHNIQUE FOR DETERMINING LASER BEAM LOCATION AFTER AZIMUTH MIRROR

(71) Applicant: BAE Systems Information and Electronic Systems Integration Inc., Nashua, NH (US)

(72) Inventors: Kevin W. Peters, Merrimack, NH (US); Chapin T. Johnson, Nashua, NH (US); Frank N. Makrides, Belmont, MA (US); Kurt P. Neeb, Weare, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 30 days.

(21) Appl. No.: 16/117,527

(22) Filed: Aug. 30, 2018

(51) Int. Cl.
  *H01S 3/00* (2006.01)
  *H01S 3/101* (2006.01)
  *G02B 7/182* (2006.01)
  *G02B 26/08* (2006.01)

(52) U.S. Cl.
  CPC .......... *H01S 3/0071* (2013.01); *G02B 7/1827* (2013.01); *G02B 26/0816* (2013.01); *H01S 3/101* (2013.01)

(58) Field of Classification Search
  CPC ... H01S 3/0071; H01S 3/101; G02B 26/0816; G02B 7/1827
  See application file for complete search history.

(56) References Cited

U.S. PATENT DOCUMENTS

| | | | | |
|---|---|---|---|---|
| 7,292,319 | B1* | 11/2007 | Carter | F41G 7/224 |
| | | | | 356/139.08 |
| 7,894,144 | B2* | 2/2011 | Wein | F41G 3/22 |
| | | | | 359/811 |
| 8,169,597 | B2* | 5/2012 | Corella | G01S 7/495 |
| | | | | 342/14 |
| 9,310,191 | B1* | 4/2016 | Corella | G02B 7/1827 |
| 2015/0061565 | A1* | 3/2015 | Corella | F41H 13/0062 |
| | | | | 318/648 |
| 2016/0187125 | A1* | 6/2016 | Corella | G02B 7/1827 |
| | | | | 356/139.08 |
| 2016/0187126 | A1* | 6/2016 | Corella | G02B 7/1827 |
| | | | | 356/139.08 |

* cited by examiner

*Primary Examiner* — Yuanda Zhang
(74) *Attorney, Agent, or Firm* — Sand, Sebolt & Wernow LPA; Scott J. Asmus

(57) ABSTRACT

A laser pointing apparatus and a method of calibration therefor utilizing a precision machined, highly reflective alignment cube to precisely calibrate the laser pointing system is provided. The calibration method can allow the calculation of the position of a transmitted beam after it leaves an azimuth mirror to high degree of accuracy over large distances.

7 Claims, 5 Drawing Sheets

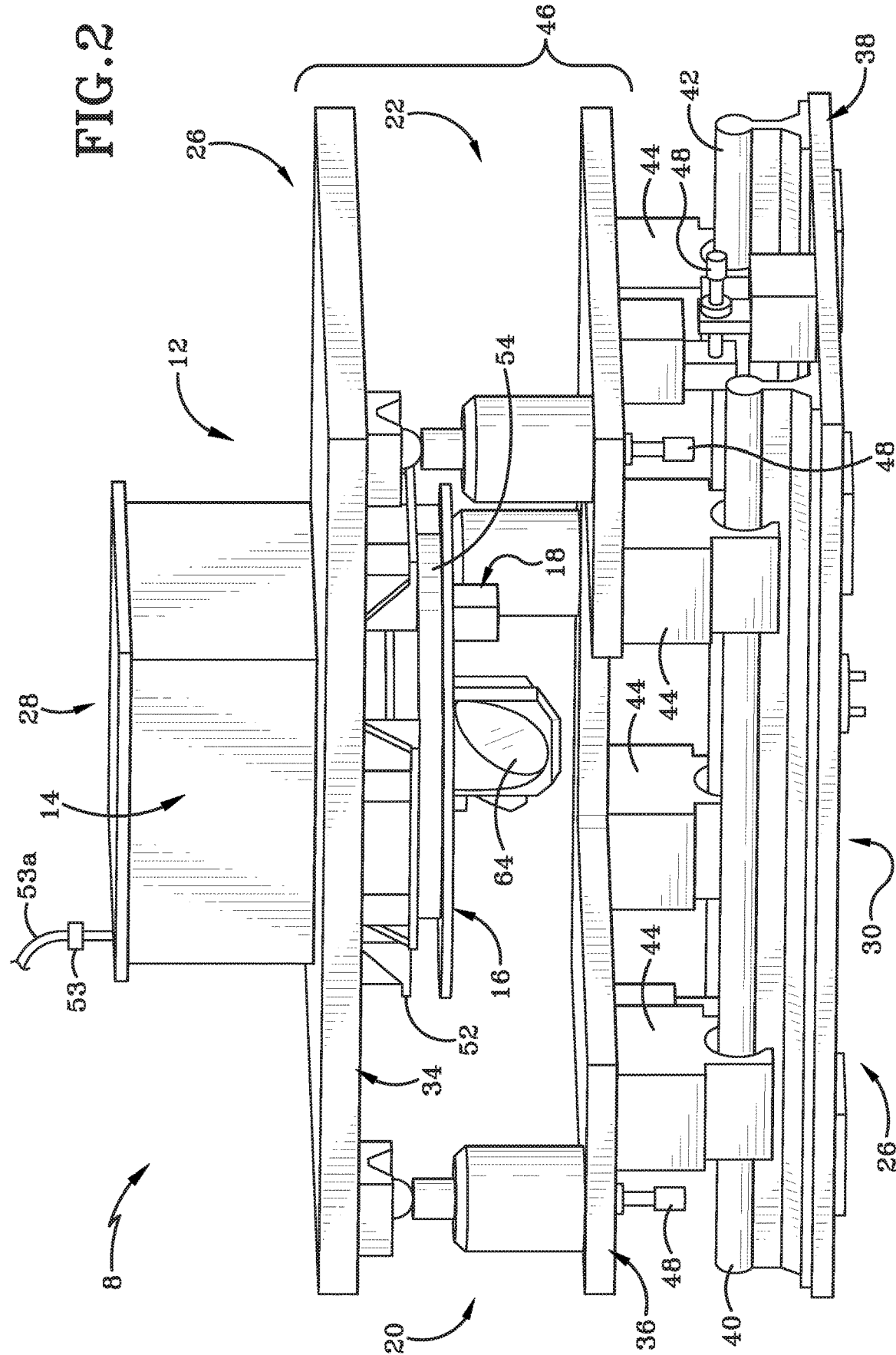

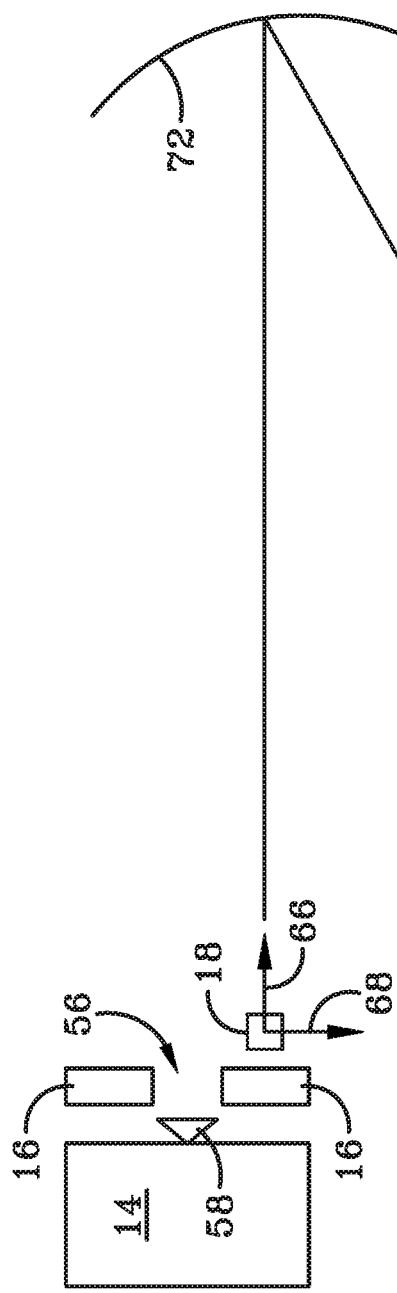
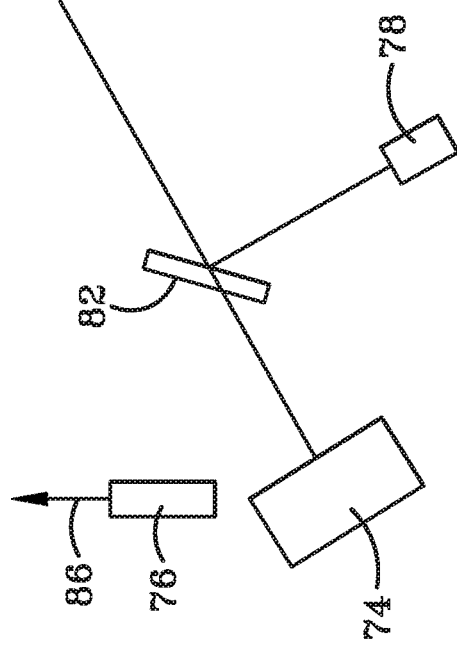
FIG. 5
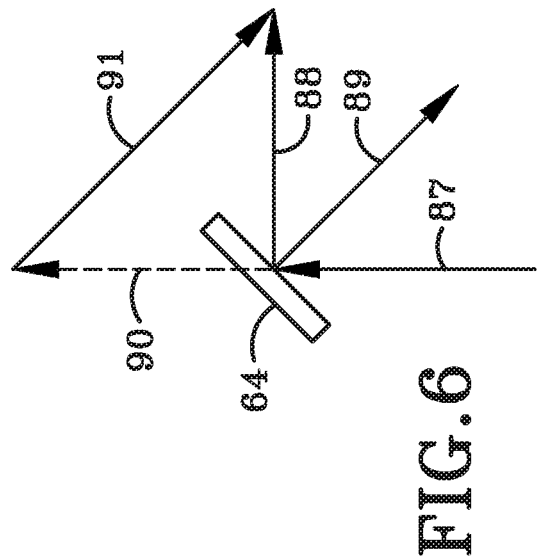
FIG. 6

CALIBRATION TECHNIQUE FOR DETERMINING LASER BEAM LOCATION AFTER AZIMUTH MIRROR

STATEMENT OF GOVERNMENT INTEREST

This invention was made with government support under a classified contract number awarded by a classified agency. The government has certain rights in this invention.

BACKGROUND

Technical Field

The present disclosure relates generally to the field of laser pointing systems. More particularly, the present disclosure relates to the calibration of a laser pointing system. Specifically, the present disclosure relates to the use of a highly accurate alignment cube on an azimuth platter to precisely align and calibrate a mirror pointing system and to accurately predict the location of the laser beam after the azimuth mirror to within a margin of error of +/−2 arcseconds.

Background Information

Laser pointing systems and/or Coude type mirror pointing systems have a wide variety of applications including laser pointing over distance as well use in telescope applications. Many laser pointing systems include an azimuth mirror that can be rotated up to 360° to direct the laser beam. In such systems, there is a need to both know and predict the location of a laser beam after it leaves the azimuth mirror. Certain applications of these laser pointing systems require an extremely high degree of accuracy to precisely direct the laser beam to its intended target. Often this involves directing a laser over a large distance including distances greater than several kilometers. Additionally, some applications require precision to the level of knowing the laser beam location within a margin of error of +/−2 arc seconds. Often this level of precision is difficult to obtain as the components need to be precisely aligned and the entire system must be calibrated to highly accurate tolerances to allow such small margin of error.

Previous calibration techniques rely on various methods that either involve additional components or are insufficient to instill the required levels of accuracy in the system. Previous calibration techniques including active alignment of the laser beam, mechanical tolerance stack ups, or coordinate measurement machine results. In systems using active alignment of the laser beam, active feedback, along with additional components, are required to align the laser pointing systems. This increases the cost and introduces additional components that must be installed and maintained to ensure accuracy. Other techniques including mechanical tolerance stack ups or coordinate measurement machine results do not provide the level of precision required by many applications of these laser pointing systems.

SUMMARY

This application addresses these and other issues by providing precision instruments that can be calibrated and a calibration technique that can accurately and precisely align these precision components to predict and direct the location of the output laser after the azimuth mirror without relying on active alignment and without the need for a large number of additional components.

In one aspect, an exemplary embodiment of the present disclosure may provide a laser pointing assembly comprising: a mounting plate; a beam director assembly mounted to the mounting plate; an azimuth platter mounted to the mounting plate; an azimuth mirror mounted to the azimuth plate; and an alignment cube installed on a face of the azimuth platter adjacent and the azimuth mirror. This exemplary embodiment or another exemplary embodiment may further provide wherein the azimuth platter further comprises: a central opening and a lens mounted within the central opening and operable to allow a transmission beam to pass through the azimuth platter. This exemplary embodiment or another exemplary embodiment may further provide wherein the beam director assembly further comprises: an input operable to deliver the transmission beam into the beam director assembly. This exemplary embodiment or another exemplary embodiment may further provide wherein the beam director assembly further comprises: at least one optical lens operable to resize the transmission beam within the beam director assembly. This exemplary embodiment or another exemplary embodiment may further provide the beam director assembly further comprises: at least one optical mirror operable to direct the transmission beam through the beam director assembly and out of the laser pointing assembly through the lens mounted within the central opening in the azimuth platter. This exemplary embodiment or another exemplary embodiment may further provide wherein the transmission beam reflects 90 degrees off of the azimuth mirror. This exemplary embodiment or another exemplary embodiment may further provide wherein the alignment cube further comprises: a first orientation; and, a second orientation orthogonal to the first orientation; wherein the mounting plate is operable to move the alignment cube from the first orientation to the second orientation. This exemplary embodiment or another exemplary embodiment may further provide at least one reflective face enabling the laser pointing assembly to be calibrated to determine the end position of a transmission beam. This exemplary embodiment or another exemplary embodiment may further provide comprising a margin of error of less than +/−2 arc seconds at the end position of the transmitted beam after the transmission beam reflects off of the azimuth mirror.

In another aspect, an exemplary embodiment of the present disclosure may provide a method of calibrating a laser pointing assembly comprising: aligning a first axis of an alignment cube to be parallel to an axis of a focal plane array (FPA) remote from the alignment cube; generating an alignment laser beam; transmitting the alignment laser beam to a first face of the alignment cube that is orthogonal to the first axis of the alignment cube; reflecting the alignment laser beam off of the first face of the alignment cube back to the FPA; adjusting the position of a portion of the assembly including the alignment cube to place the reflected alignment laser beam on the FPA; and repetitively alternating aligning the first axis of the alignment cube with adjusting the portion of the assembly to place the reflected alignment laser beam on the FPA until both the first axis of the alignment cube and the axis of the FPA remain aligned substantially parallel to one another and the reflected alignment laser beam remains on the FPA. This exemplary embodiment or another exemplary embodiment may further provide generating a transmission beam from the laser pointing assembly to the FPA; and, calculating a first direction cosine vector of the transmission beam. This exemplary embodiment or another exemplary embodiment may further provide rotating the portion of the assembly including the alignment cube 90° about the first axis of the alignment cube; re-aligning the first axis of the alignment cube to be parallel to the axis of the FPA; transmitting the alignment laser beam to a second face of the alignment cube that is orthogonal to the first axis and the first face of the alignment cube; reflecting the alignment laser beam off of the second face of the alignment cube back to the FPA; re-adjusting the portion of the assembly to place the reflected alignment laser beam on the FPA; and repetitively alternating re-aligning the first axis of the alignment cube with the axis of the FPA with re-adjusting the portion of the assembly to place the reflected alignment laser beam on the FPA until both the first axis of the alignment cube and the axis of the FPA remain aligned substantially parallel to one another and the reflected alignment laser beam remains on the FPA. This exemplary embodiment or another exemplary embodiment may further provide installing an azimuth mirror onto the laser pointing assembly; generating a transmission beam from the laser pointing assembly; reflecting the transmission beam off of the azimuth mirror; calculating a second direction cosine vector of the transmission beam; and calculating an azimuth mirror normal. This exemplary embodiment or another exemplary embodiment may further provide recording the position of the portion of the assembly including the alignment cube and the coordinates (x,y) of the alignment laser beam on the FPA, before rotating the portion of the assembly. This exemplary embodiment or another exemplary embodiment may further provide re-recording the position of the portion of the assembly including the alignment cube and the coordinates (x,y) of the alignment laser beam on the FPA, before installing the azimuth mirror. This exemplary embodiment or another exemplary embodiment may further provide calculating the predicted end point for the transmission beam after it reflects off of the azimuth mirror. This exemplary embodiment or another exemplary embodiment may further provide wherein generating the transmission beam further comprises: delivering the transmission beam to a beam director assembly, the transmission beam having a first size; resizing the transmission beam to a second size; and directing the resized transmission beam out of the beam director assembly and to the azimuth mirror. This exemplary embodiment or another exemplary embodiment may further provide automatically calculating the first and second direction cosine vectors of the transmission beam and the azimuth mirror normal. This exemplary embodiment or another exemplary embodiment may further provide automatically aligning and re-aligning the first axis of the alignment cube parallel to the axis of the FPA. This exemplary embodiment or another exemplary embodiment may further provide automatically recording and re-recording the position of the portion of the assembly including the alignment cube and the coordinates (x,y) of the alignment laser beam.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 2 is a front right perspective view of the laser pointing apparatus of the present disclosure.

FIG. 5 is an overhead schematic view of the calibration system showing the alignment laser.

FIG. 6 is a schematic view of a laser beam path of the present disclosure.

Similar numbers refer to similar parts throughout the drawings.

DETAILED DESCRIPTION

Figure 1:
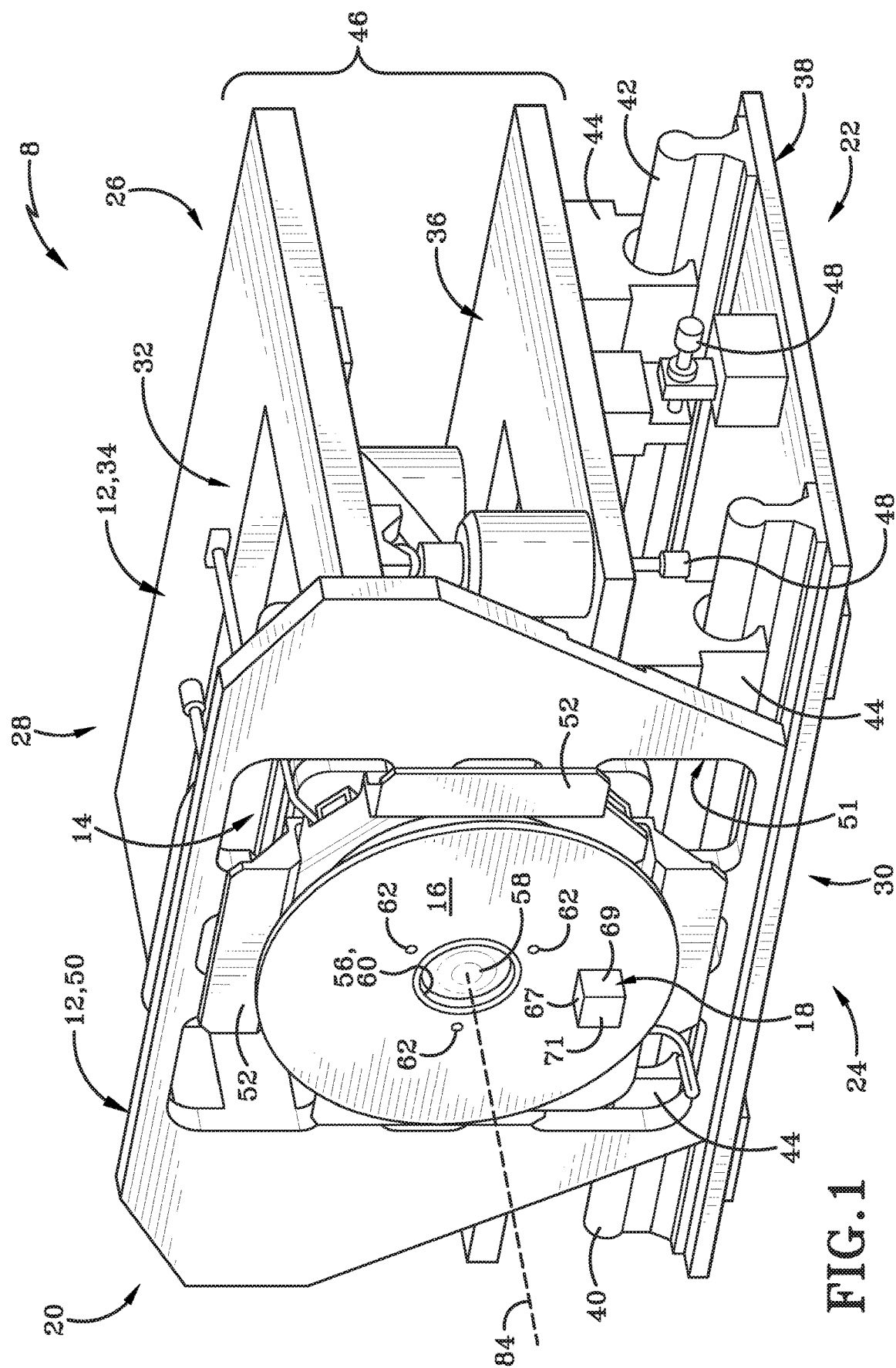
FIG. 1 a top right perspective view of the laser pointing apparatus of the present disclosure.

Provided and described herein is a laser pointing assembly 8, which may include an optical bench 12, a beam director assembly 14, an azimuth platter 16, and an alignment cube 18. Further provided herein is a system and method for calibration of the laser pointing assembly 8. The system for calibrating the laser pointing assembly is hereinafter referred to as calibration system and is generally indicated as reference 10, which is discussed further below.

With reference to FIGS. 1 and 2, the laser pointing assembly 8 is shown. The foundation for laser pointing assembly 8 is optical bench 12, which can have a first end 20 that is spaced apart from a second end 22, the first end 20 and second end 22 defining a longitudinal direction therebetween. Optical bench 12 can further have a front side 24 spaced apart from a rear side 26, defining therebetween a horizontal direction. Additionally, optical bench 12 can have a top side 28 and a bottom side 30, defining therebetween a vertical direction.

Optical bench 12 may include a mount portion 32, which may further include top plate 34, center plate 36, bottom plate 38, a first mounting rail 40, a second mounting rail 42, and a plurality of mounting assemblies 44. According to one aspect, top plate 34 and center plate 36 of mount portion 32 can be operationally connected and predominately form the support structure 46, which can substantially make up the rear side 26 of optical bench 12.

Both top plate 34 and center plate 36 can have a longitudinal width that is less than the full longitudinal width of optical bench 12. Top plate 34 and center plate 36 can both further have a general CU' shape that can be oriented such that the opening of the CU' faces the front side 24 of optical bench 12, the side arms of the CU' extend horizontally and are parallel to the first and second ends 20, 22, of optical bench 12, and the bottom of the CU' extends longitudinally and is parallel to the rear side 26 of optical bench 12. Top plate 34 can be adjustably mounted to center plate 36 to permit vertical movement therebetween as well as tipping movement in a forward/rearward direction. Movement of the optical bench 12 and its components is discussed further herein with respect to the operation thereof.

Bottom plate 38 of optical bench 12 can serve as a foundation for optical bench 12. Extending upwards from bottom plate 38 can be first and second mounting rails 40, 42, which can span the longitudinal width of optical bench 12. Mounting rails 40, 42 can be spaced apart and parallel to provide adequate foundation for support structure 46. The exact placement of mounting rails 40, 42 can be determined according to the specific configuration of optical bench as determined by a person of skill in the art. Support structure 46 can be connected to mounting rails 40, 42 through mounting assemblies 44 which can serve to attach support structure 46 to mounting rails 40, 42 and also to permit movement along mounting rails 40, 42 in the longitudinal direction, as discussed further herein.

Optical bench 12 can further include a series of adjustment knobs 48 that can be operationally connected to optical bench 12 to permit movement in horizontal, vertical, or longitudinal axes, as well as tip, tilt, and/or rotational movements. Adjustment knobs 48, as described and shown herein can adjust optical bench 12 through manual manipulation, however, it will be understood that the adjustment of optical bench 12 can be performed through motorized and or automated means without deviation from the scope herein. The adjustment knobs 48 and various movements are discussed further with regards to the calibration system 10.

Optical bench 12 may further include a mounting plate 50 which can have a first position, as seen in FIG. 1, and a second position, as seen in FIG. 2. As shown in FIG. 1, mounting plate 50 can extend vertically on front side 24 of optical bench 12, with a top end extending vertically above top plate 34 and a bottom end terminating at or near bottom plate 38. Mounting plate 50 can extend longitudinally along front side 24 of optical bench with a first end corresponding to first end 20 of optical bench 12 and a second end corresponding to second end 22 of optical bench 12. Mounting plate 50 can have a longitudinal width greater than the width of top plate 34 and center plate 36 to prevent obstruction of mounting plate 50 as it moves from first position to second position. Mounting plate 50 may have a central aperture 51 that permit the mounting of beam director assembly 14, azimuth platter 16, and alignment cube 18 therein. The size and shape of central aperture 51 can vary according to the desired application and size of components mounted. According to one aspect, central aperture 51 can be sized similar to the open area within the CU' shape of top plate 34 and center plate 36.

According to one aspect, mounting plate 50 can be rotationally mounted to top plate 34 such that the joint of top plate 34 and mounting plate 50 can define a longitudinal axis about which mounting plate 50 can turn. According to another aspect, the longitudinal axis of rotation for mounting plate 50 can be defined by the intersection of mounting plate 50 with center plate 36. According to another aspect, the longitudinal axis of rotation for mounting plate 50 can fall between top plate 34 and center plate 36.

According to another aspect, mounting plate 50 may be fixedly attached to mount portion 32 and serve as the mounting point for the beam director assembly (BDA) 14 and azimuth platter 16. Specifically, mounting plate 50 can further include a mounting bracket 52 which can span the vertical and longitudinal widths of central aperture 51 to allow mounting of beam director assembly 14, azimuth platter 16, and associated components (further described below) thereon. Further according to this aspect, mounting plate 50 can allow movement of the BDA 14, azimuth platter 16, and mounting bracket 52 into the second position, as further described below.

BDA 14, best seen in FIG. 2, can be an enclosed structure having a generally rectangular shape and housing one or more mirrors and/or optics operable to direct a laser beam and/or resize a laser beam as it passes through BDA 14. The specific configuration of mirrors and/or optics within BDA 14 can vary depending on the desired beam path and beam size, and can be adjusted according to the installation parameters. The operation of BDA 14 is described further below.

According to one aspect, BDA 14 may contain a laser generator capable of generating a laser beam therein. According to another aspect, BDA 14 may include a fiber optic input 53 operable to deliver a laser beam to the BDA 14 from a laser beam generator located remote from the BDA 14. The fiber optic input 53 can be a coupler or port to which a fiber optic cable 53a can connect. Fiber optic cable 53a can be a standard cable known in the art and operable to transmit electromagnetic radiation there through.

Azimuth platter 16 can be a disc having a front face, a rear face, a continuous side edge, and a central opening 56. The front face of azimuth platter 16 can face towards the front side 24 of optical bench 12 when mounting plate 50 is in the first position and towards the bottom side 30 of optical bench 12 when mounting plate 50 is in the second position. Azimuth platter 16 can include mounting positions for the alignment cube 18 and the azimuth mirror 64 on its front face while mounting to one or more optical encoders 54 on its rear face.

According to one aspect, azimuth platter 16 can be rotatably mounted to mounting plate 50 in a manner that allows a full 360 degree rotation of azimuth platter 16 about a central axis. The central axis can be defined by the transmission beam 84, as discussed further below. Rotation of the azimuth platter 16 can be manual, motorized, automated, or through any other means as chosen by a person of skill according to the desired application and use of azimuth platter 16.

Central opening 56 in azimuth platter 16 can be a through hole that can extend through the entire thickness of azimuth platter 16. Central opening 56 can permit transmission beam 84 to pass through the azimuth platter 16. Central opening 56 can further include an optical lens assembly 58 operable to size or direct transmission beam as it passes through central opening 56. Operation of the lens assembly 58 and transmission beam is discussed in depth below.

Central opening can further include an outer rim or edge 60 that can provide a mount 62 for azimuth mirror 64, which can be removably attached thereto. The means for attachment can be chosen by a person of skill according to the desired use. According to one aspect, azimuth mirror 64 can be bolted to azimuth platter 16 and mount 62. According to another aspect, azimuth mirror 64 can be screwed, bonded, or clipped to mount 62.

Lens assembly 58 can be a standard optical lens that can collimate, resize, or redirect transmission beam 84 as desired. According to one aspect, lens assembly 58 can be a custom lens assembly able to collimate, resize, or redirect transmission beam 84. According to another aspect, lens assembly 58 may be omitted.

Optical encoder 54 may be mounted behind azimuth platter 16 and forward of BDA 14 and can be a ring type optical encoder 54 as to not obstruct transmission beam 84 from passing through the optical encoder 54. Optical encoder 54 can allow an operator to determine and track the rotation and precise position of azimuth platter 16 relative to a chosen zero point as it rotates about the 360 degree central axis.

Figure 3B:
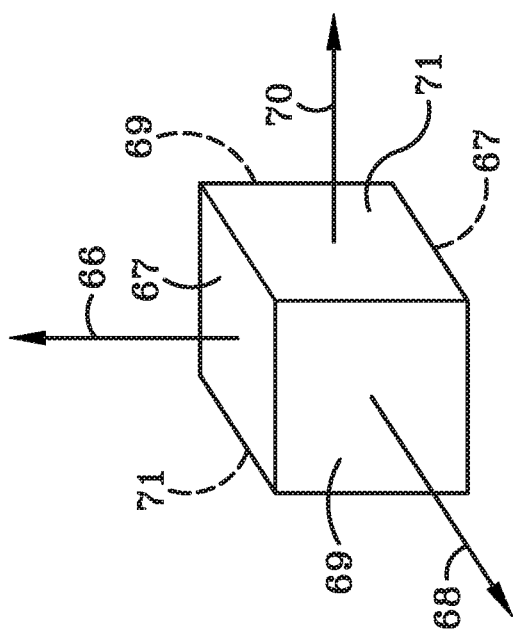
FIG. 3B is a top right perspective view of an alignment cube of the present system post rotation.
Figure 3A:
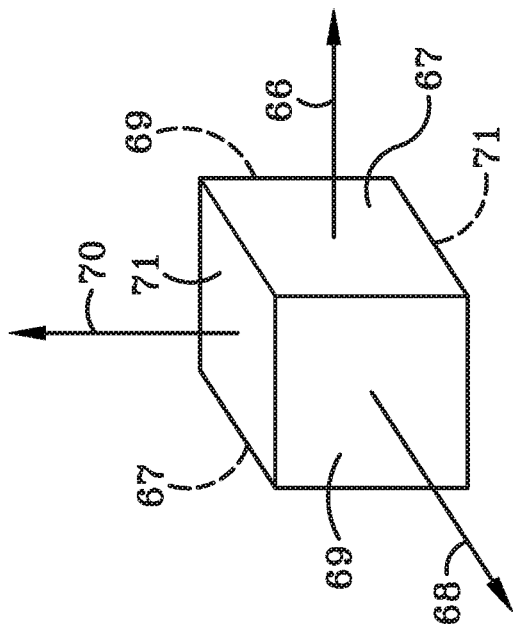
FIG. 3A is a top right perspective view of an alignment cube of the present system prior to rotation.

With reference to FIGS. 1-4, but with particular reference to FIGS. 3A-B, the alignment cube 18 can be can be precision machined cube with each face of the alignment cube 18 manufactured at 90° relative to the adjacent faces of alignment cube 18 with a margin of error of +/− less than 1 arcsecond. By virtue of its cube shape, alignment cube 18 has six faces with two opposing faces oriented along an x-axis 66, two opposing faces oriented along a y-axis 68, and two opposing faces oriented along a z-axis 70. Hereinafter, these faces will be referred to as the x-face(s) 67, y-face(s)

69, and z-face(s) 71 respectively. Reference to these faces can refer to either or both of the corresponding faces, unless specifically stated otherwise.

The overall size of alignment cube 18 can vary depending upon the desired application, provided the precision relationship between each of the faces of alignment cube 18 remains consistent. According to one aspect, alignment cube 18 can be 25 mm×25 mm×25 mm. According to another aspect, alignment cube 18 can be 12.5 mm×12.5 mm×12.5 mm. According to another aspect, alignment cube 18 may be any of size, including both larger and smaller dimensions provided that the size chosen provides sufficient reflection of the alignment laser beam 80 to the focal plane array (FPA) 74, as discussed further herein.

Alignment cube 18 may be machined out of any material suitable for the desired application. According to one aspect, alignment cube 18 is precisely machined out of a metal such as steel, stainless steel, or aluminum. According to another aspect, alignment cube 18 may be machined out of glass or other suitable optical materials. According to another aspect, faces of alignment cube 18 can be treated with coatings or chemical treatments to increase the reflectivity of each face of alignment cube 18. Alignment cube 18 can be fixed to the front face of azimuth platter 16 or can be removably mounted thereon. According to one aspect, alignment cube 18 can be mounted on front face of azimuth platter 16 between the azimuth mirror 64 mount 62 and the edge of azimuth platter 16. According to this aspect, alignment cube 18 can be longitudinally centered on the azimuth platter 16 and evenly spaced between central opening 56 and the edge of azimuth platter 16. Alignment cube 18 can maintain this position relative to central opening 56 and edge of azimuth platter throughout the 360 degree rotation of azimuth platter.

Figure 4:
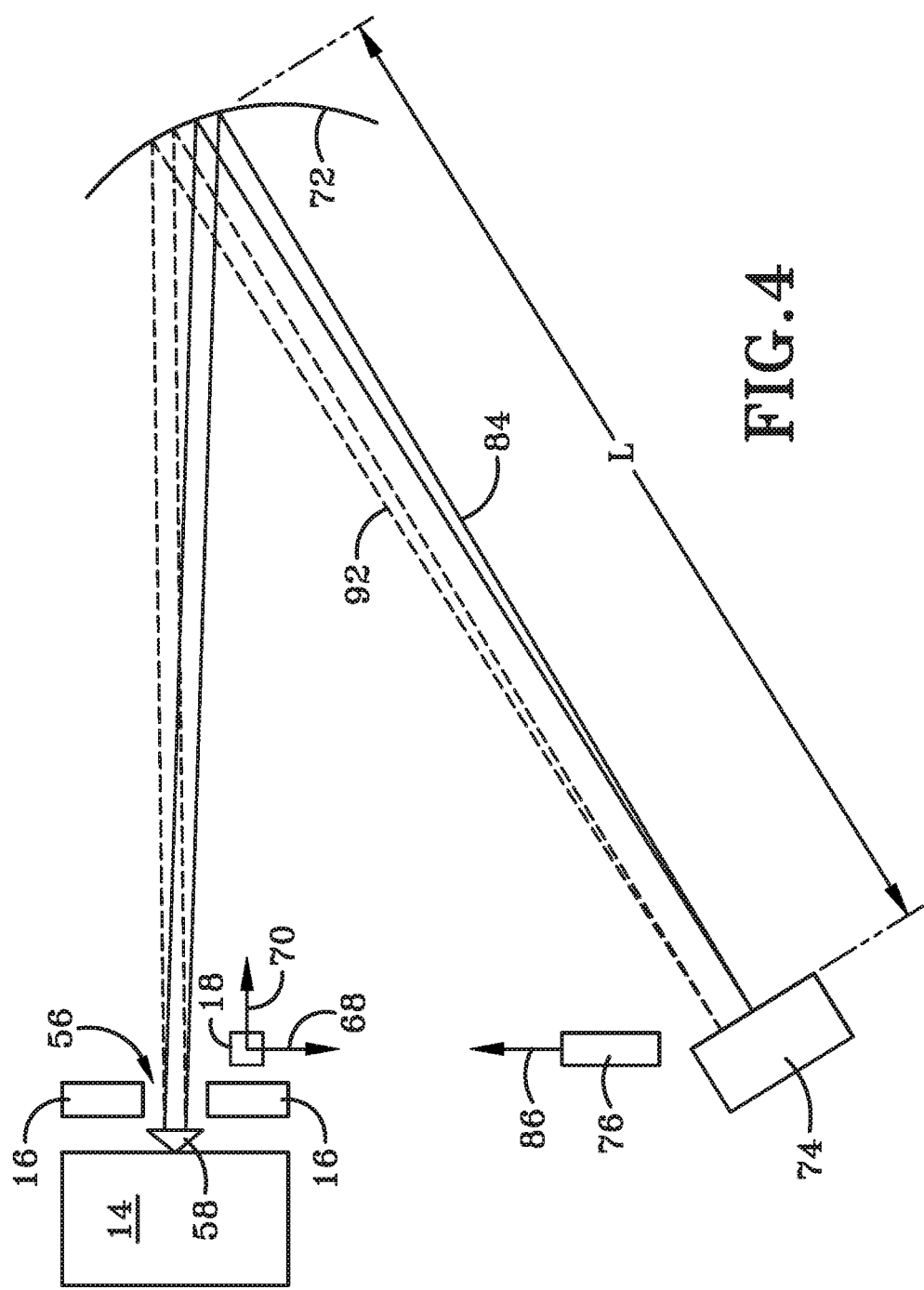
FIG. 4 is an overhead schematic view of the calibration system of the present disclosure.

With reference to FIGS. 4 and 5, calibration system 10 is shown. Calibration system 10 can include a series of instruments used to precisely calibrate laser pointing assembly 8 such that the position and end point of transmission beam 84 from laser pointing assembly 8 can be accurately predicted at long distances exceeding several kilometers. Calibration system 10 may include laser pointing assembly 8, an off-axis parabola 72, a FPA 74, an alignment scope 76, an alignment laser generator 78, an alignment laser beam 80, and a beam splitter 82.

Off-axis parabola 72 can be a precision off-axis parabolic reflector or mirror. Off-axis parabola 72 (also referred to herein as parabola 72) can be precision machined or manufactured from a highly reflective material or can be coated with a chemical or physical coating to increase reflectivity of parabola 72. According to one aspect, parabola 72 can be mirrored glass.

Off-axis parabola 72 may have a focal length (indicated in FIG. 4 as (L)) of approximately 2 meters. Generally, using a longer focal length with calibration system 10 can provide additional accuracy to laser pointing assembly 8, however, a balance must be struck because longer focal length for the parabola 72 requires a larger FPA 74. Therefore, the FPA 74 size is often the limiting factor for the focal length of the off-axis parabola 72, with the size of the facility in which the laser pointing assembly 8 is installed and/or calibrated also a contributing factor. Therefore, according to one aspect, an off-axis parabola 72 with a focal length of 2 meters can be used. According to another aspect, an off-axis parabola 72 with a focal length of 100 inches can be used.

FPA 74 can be an imaging device having a series of light sensing pixels arranged in a square or rectangular pattern. As discussed above, the size of FPA 74 can be a limiting factor for the calibration system 10 setup, so the appropriate size of the FPA 74 may vary and can be chosen by a person of skill as dictated by the specific configuration of the calibration system 10 in which the FPA 74 is to be installed. Some of the relevant factors to the size of the FPA 74 include the desired resolution, the focal length of the parabola 72, and the size of the transmission beam 84 and/or the alignment laser beam 80.

According to one aspect, FPA 74 can have be a pixelated grid with a sub-pixel resolution. According to another aspect, FPA 74 can include a camera or other imaging device that can receive and record the location of a laser beam spot on the FPA 74 grid.

Alignment scope 76 can be an autocollimator, telescope, camera, or other similar device that can allow an operator to visualize the location and orientation of the alignment scope 76 relative to the optical bench 12 and alignment cube 18, as discussed below.

Alignment laser generator 78 can generate alignment laser beam 80 which can be a Helium-Neon (HeNe) laser, an infrared laser, or any other laser suitable for the application as chosen by a person of skill. The choice of laser type for generator 78 and alignment laser beam 80 can be tied to the FPA 74 and/or camera being used as the alignment laser beam 80 should be compatible with the FPA 74 and/or camera.

Beam splitter 82 can be a standard pellicle optic or a movable folding mirror which can allow the alignment laser generator 78 to be placed to the side of the laser path and the alignment laser beam 80 to be folded into the laser path by beam splitter 82, as illustrated in FIG. 5 and described below.

Having thus described the individual systems and elements, the process for calibrating a laser pointing assembly 8 using calibration system 10 is now described.

The calibration process for laser pointing assembly 8 may allow an operator to both ascertain the exact location of the azimuth mirror 64 and to calculate the azimuth mirror normal. Having highly accurate knowledge of the location of azimuth mirror 64 and the azimuth mirror normal, along with knowing the location of beam generator, may further allow calculation of the output location of the transmission beam 84 after it reflects off of the azimuth mirror 64 as the mirror 64 is rotated 360 degrees about its axis. Thus, proper calibration of the laser pointing assembly 8 using calibration system 10 can allow laser pointing assembly to be highly accurate over a long distance. According to one aspect, the transmission beam 84 can be accurately sent to a remote receiving unit (not shown) which can be located at a distance in excess of several kilometers away from the laser pointing assembly 8.

Prior to calibration of the laser pointing assembly 8, the operator should record the position of the azimuth platter 16 and the off-axis parabola 72. The position of azimuth platter 16 may change during the calibration process, so the known position of the platter 16 prior to starting the calibration can give a zero position for the azimuth platter 16, which can later be used to calculate the azimuth mirror normal and transmission. The position of the off-axis parabola 72 should be recorded due to the fact that any movement, regardless of how slight, of the parabola 72 during calibration can negatively impact the calibration process, which can in turn introduce error into the end results. According to one aspect, the position of the off-axis parabola 72 may be recorded by placing a precise mirror or fiducial surface on the parabola 72, or alternatively, on the parabola mount. The position may then be measure using an autocollimator, theodolite, or other suitable device. By recording the exact position of the parabola 72 prior to calibration, an operator can re-position the parabola 72 to the proper placement in the event of accidental movement, thus ensuring consistent results.

In accordance with one exemplary embodiment, calibration of a laser pointing assembly 8 to the requisite degree of accuracy can be accomplished according to the following method: first, the alignment cube 18 is connected to the azimuth platter 16 with one of the z-faces 71 adjacent to the azimuth platter 16. This placement of alignment cube 18 results in the z-axis 70 being oriented perpendicular to the azimuth platter 16 and parallel to the beam path of transmission beam 84, when the azimuth platter 16 is oriented as shown in FIG. 1. Once the alignment cube 18 is installed on the azimuth platter 16, the optical bench 12 should be set with mounting plate 50 in the first position, as seen in FIG. 1. This first position correlates to the schematic shown in FIG. 4.

With mounting plate 50, BDA 14, azimuth platter 16, and mounting bracket 52, in the first position, the alignment cube 18 is further oriented with the y-axis 68 running perpendicular to the z-axis 70 but in the same horizontal plane, while the x-axis 66 is perpendicular to the y-axis 68 and z-axis 70, but in a vertical plane. This orientation is shown with regards to the alignment cube in FIG. 3A. With the alignment cube 18 now properly oriented, the next step is to align the y-face 69 of the alignment cube 18 closest to the FPA 74 with the y-axis 86 of the FPA 74 using the alignment scope 76. Proper alignment should result in the y-face 69 of the alignment cube 18 and the y-axis 86 of the FPA 74 being substantially parallel. According to one aspect, the y-axis 68 of the alignment cube and y-axis 86 of the FPA 74 can be in separate planes, so long as both axes are parallel.

Actual alignment of the y-axis 68 of the alignment cube 18 with the y-axis 86 of the FPA 74 involves moving the entire optical bench 12 using adjustment knobs 48. Specifically, adjustment knobs 48 can be manually rotated to effect movement along the horizontal, vertical, or longitudinal axes of the optical bench 12. Adjustment knobs 48 can further effect movement to tip or tilt the optical bench 12. Tilt movements of the optical bench 12 can include tilting the top plate 34 relative to the center plate 36 along the longitudinal length of top plate 34, while tip movements can allow top plate 34 to tip forward or rearward relative to center plate 36. According to one aspect, adjustment knobs 48 can be operationally connected to one or more motors to permit mechanized movement. According to another aspect, movement of optical bench 12 can be automated.

Although alignment can involve movement of the optical bench 12, including the azimuth platter 16 and alignment cube 18, it will be understood that alignment can alternatively involve movement of the FPA 74, or movement of both the optical bench 12 and FPA 74. It is therefore contemplated that each of these elements can be adjusted to effect the desired alignment, and the discussion herein relating to movement of the optical bench 12 implicitly includes adjustment of the FPA 74, if necessary and/or desirable according to the actual implementation of the calibration system 10.

Once the y-axis 68 of the alignment cube 18 and the y-axis 86 of the FPA 74 are parallel, alignment laser generator 78 can generate the alignment laser beam 80 which can be directed off of beam splitter 82, to the off-axis parabola 72, where it is further reflected to the z-face 71 of the alignment cube 18. The highly reflective nature and/or coating of the alignment cube 18, as discussed above, can then cause the alignment laser beam 80 to reflect back to the off-axis parabola 72, and from the parabola 72 to the FPA 74.

If the alignment laser beam 80 spot does not fall onto the FPA 74, optical bench 12 can be adjusted using adjustment knobs 48 to direct the alignment laser beam 80 spot to the FPA 74. The alignment laser beam 80 spot can be centered on the FPA 74, but the calibration system 10 does not require that the spot be centered. Instead, having the spot fall on the FPA 74 can allow an operator to record the coordinates (x,y) of the spot's centroid which can be used to perform the required calculations.

According to one aspect, the alignment laser beam 80 can have a spot on the FPA 74 that is approximately 4-6 pixels in diameter. Given a sub-pixel resolution on the FPA 74, this can allow the centroid to be measured with an accuracy of less than one pixel. Similarly, the transmission beam 84 can have a spot that is also 4-6 pixels in diameter, thus allowing accuracy of less than one pixel when measuring the centroid of the transmission beam 84 spot on the FPA 74.

If the reflected alignment laser beam 80 is on the FPA 74, the operator can then verify that the y-axis 68 of the alignment cube 18 and the y-axis 86 of the FPA 74 remain parallel to each other. If the y-axes 68, 86 are parallel, the operator can move on to the next steps in the calibration process.

If the y-axes 68, 86 are not parallel, however, the operator can again adjust the optical bench 12 to bring the y-axis 68 of the alignment cube 18 and the y-axis 86 of the FPA 74 back into parallel. Once parallel, the operator can verify that the reflected alignment laser beam 80 remains on the FPA 74. These steps may be repeated as necessary, alternating between aligning the y-axes 68, 86 and adjusting the alignment laser beam 80 to be on the FPA 74, until both conditions are simultaneously present, i.e. the y-axes 68, 86 are parallel and the alignment laser beam 80 spot is on the FPA 74.

Once the conditions above are achieved, the operator can next record the position of the azimuth platter 16 via the optical encoder 54 and the coordinates (x,y) of the alignment laser beam 80 centroid on the FPA 74 prior to continuing the calibration process.

Next, the transmission beam 84 is generated. Once generated, the coordinates (x, y) of the transmission beam 84 centroid on the FPA 74 are recorded. If the transmission beam 84 centroid is not on the FPA 74, the alignment cube 18 may be adjusted until both the reflected alignment laser beam 80 and the generated transmission beam 84 centroids are both simultaneously on the FPA 74. This is best seen as illustrated in FIG. 4. Specifically, the dotted line, indicated as 92, represents a location of transmission beam 84 prior to the making the adjustments, while the solid lines represent transmission beam 84 post adjustment. Mechanisms for adjusting the alignment cube 18 may include shims placed under the alignment cube 18 or a mechanical mechanism to adjust alignment cube 18. Once this is complete, the reflected alignment laser beam 80 spot centroid on FPA 74 is recorded and the transmission beam 84 spot centroid on FPA 74 is recorded. These centroid positions are used to determine a first direction cosine vector of the transmission beam 84 with respect to the alignment cube 18.

To calculate the first direction cosine vector of the transmission beam 84 relative to the alignment cube 18, the (x, y) centroid coordinates of the transmission beam 84 and the alignment laser beam 80 are used according to the following equations:

$$\tan(\theta(x)) = h(x)/f$$

$$\tan(\theta(y)) = h(y)/f$$

where θ(x) and θ(y) are the angle in x and y relative to the z-axis, respectively, to calculate the direction cosine component; f is the focal length of parabola 72; h(x) is the x distance on the focal plane between laser beam 80 and transmission beam 84; and h(y) is the y distance on the focal plane between laser beam 80 and transmission beam 84.

The first direction cosine vector of the generated laser beam 84 relative to the alignment cube 18 is shown in FIG. 6 as vector 87.

Next, the operator can move the mounting plate 50 ninety (90) degrees to the second position, as shown in FIG. 2. This movement is effectively a rotation about the y-axis 68 of the alignment cube 18 such that the y-axis 68 of alignment cube 18 retains the same orientation relative to the other components of the calibration system 10. FIG. 3B is a representation of the alignment cube 18 after this 90 degree rotation has occurred, with y-axis 68 remaining in the same vector while the z-axis 70 is now in the vertical plane and the x-axis 66 is now in the same horizontal plane as the y-axis 68.

Movement of the mounting plate 50 can cause the front face of azimuth platter 16 to face bottom side 30 of optical bench 12. The open portions of the 'U' shaped top and center plates 34, 36 of optical bench 12 can allow access to the appropriate components for continued calibration. This configuration can further permit alignment laser beam 80 and/or transmission beam 84 from being obstructed during calibration and operation.

Alternatively and according to one aspect, mounting plate 50 may remain stationary while mounting bracket 52, BDA 14, azimuth platter 16, and other components associated therewith, move or rotate through central aperture 51 and into the second position.

The y-axis 68 of the alignment cube 18, having the same orientation as before the rotation, can now be aligned again with the y-axis 86 of the FPA 74 through movement of the optical bench 12. Once the y-axes 68, 86 are aligned, alignment laser generator 78 can again generate alignment laser beam 80 to reflect off of beam splitter 82 to off-axis parabola 72, to the alignment cube 18. The adjusted orientation now provides that the alignment laser beam 80 will reflect off of the x-face 67 of the alignment cube 18 and back to the FPA 74 by way of the off-axis parabola 72.

The optical bench 12 can again be adjusted using adjustment knobs 48 until the alignment laser beam 80 spot again appears on the FPA 74.

As before, the alignment of the y-axis 68 of the alignment cube 18 with the y-axis of the FPA 74 may be verified using the alignment scope 76. The optical bench 12 position may be adjusted, again alternating steps, until both the y-axes 68, 86 are aligned and the alignment laser beam 80 spot remains on the FPA 74.

Once the y-axes 68, 86 are properly aligned and the alignment laser beam 80 spot is on the FPA 74, the position of the azimuth platter 16 can again be recorded via the optical encoder 54 and the coordinates (x,y) of the alignment laser beam 80 spot centroid can be measured and recorded.

Next, the azimuth mirror 64 can be installed on the azimuth platter 16 along the outer edge 60 of and over central opening 56. As best seen in FIG. 2, the azimuth mirror 64 can be directly in the beam path of transmission beam 84 thus altering beam path by 90 degrees.

Once the azimuth mirror 64 is installed on the azimuth platter 16, the position of the azimuth mirror 64 may be adjusted until the transmission beam 84 and alignment laser beam 80 simultaneously appear on the FPA 74. According to one aspect, the position of the azimuth mirror 64 may be adjusted through placement of one or more shims under the mounting points of the azimuth mirror 64. According to another aspect, azimuth mirror may be adjusted by other mechanical methods, including manual or motorized adjustments. In general, azimuth mirror 64 can rotate 360 degrees about the axis substantially defined by transmission beam 84 as it exits central opening 56, thereby allowing transmission beam 84 to be directed in any direction around that 360 degree rotational plane.

Then, once azimuth mirror 64 is installed and adjusted, transmission beam 84 may be generated. According to one aspect, transmission beam 84 may be generated from a laser beam generator within BDA 14. According to another aspect, transmission beam 84 may enter the BDA 14 from the fiber optic input 53.

Transmission beam 84 may then be directed through BDA 14 by the series of mirrors and optics and out through lens assembly 58. According to one non-limiting example, a beam can enter the BDA 14 through the fiber optic input 53, pass through a first lens to collimate the beam, and then be directed through a series of telescope lenses to increase the size of the beam to the desired output size, before being directed out through lens assembly 58. Transmission beam 84 can then reflect off of azimuth mirror 64 at a 90 degree angle.

Once transmission beam 84 is generated, it may reflect off of azimuth mirror 64, and travels off of parabola 72 to FPA 74. The transmission laser beam 84 spot centroid and the reflected alignment laser beam 80 spot centroid (x,y) coordinates on FPA 74 are then recorded and may be used to calculate a second direction cosine vector of transmission beam 84 after it reflects off of the azimuth mirror 64. This second direction cosine vector of the transmission beam 84 relative to the azimuth mirror 64 is shown in FIG. 6 as vector 88. Then, using the first direction cosine vector 87, the second direction cosine vector 88, and the known positions of the azimuth platter 16 and known coordinates (x,y) of the alignment laser beam 80 spot, the azimuth mirror normal, referenced in FIG. 6 as vector 89, may be calculated, having the requisite accuracy of +/− less than 2 arc seconds.

With continued reference to FIG. 6, first direction cosine vector 87 is moved to have its origin coincident with second direction cosine vector 88, thus creating vector 90. Vector 91 may then be calculated as the difference taken from the subtraction of vector 90 from second direction cosine vector 88. Vector 91 is parallel to the azimuth mirror normal 89 and the direction cosine vector of the azimuth mirror normal 89 is now known.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the present disclosure. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration set out herein are an example and the present disclosure is not limited to the exact details shown or described.

The invention claimed is:

1. A laser pointing assembly comprising:
   a mounting plate;
   a beam director assembly mounted to the mounting plate;
   an azimuth platter mounted to the mounting plate;
   an azimuth mirror mounted to the azimuth platter; and
   an alignment cube installed on a face of the azimuth platter adjacent to the azimuth mirror,
   wherein the alignment cube includes a first orientation and a second orientation orthogonal to the first orientation;
   wherein the mounting plate is operable to move the alignment cube from the first orientation to the second orientation; and
   wherein the alignment cube includes at least one reflective face enabling the laser pointing assembly to be calibrated to determine an end position of a transmission beam.

2. The laser pointing assembly of claim 1 wherein the azimuth platter further comprises:
   a central opening and a lens mounted within the central opening and operable to allow the transmission beam to pass through the azimuth platter.

3. The laser pointing assembly of claim 2 wherein the beam director assembly further comprises:
   at least one optical mirror operable to direct the transmission beam through the beam director assembly and out of the laser pointing assembly through the lens mounted within the central opening in the azimuth platter.

4. The laser pointing assembly of claim 1 wherein the beam director assembly further comprises:
   an input operable to deliver the transmission beam into the beam director assembly.

5. The laser pointing assembly of claim 1 wherein the beam director assembly further comprises:
   at least one optical lens operable to resize the transmission beam within the beam director assembly.

6. The laser pointing assembly of claim 1 wherein the transmission beam reflects 90 degrees off of the azimuth mirror.

7. The laser pointing assembly of claim 1 further comprising a margin of error of less than +/−2 arc seconds at the end position of the transmission beam after the transmission beam reflects off of the azimuth mirror.

* * * * *